United States Patent
Weiss et al.

(10) Patent No.: US 7,865,303 B2
(45) Date of Patent: Jan. 4, 2011

(54) METHOD OF PROVIDING A NAVIGATIONAL ROUTE FOR A VEHICLE NAVIGATION SYSTEM

(75) Inventors: John P. Weiss, Shelby Township, MI (US); Scott P. Geisler, Clarkston, MI (US); Chester A. Huber, Grosse Pointe Farms, MI (US)

(73) Assignee: General Motors LLC, Detroit, MI (US)

( * ) Notice: Subject to any disclaimer, the term of this patent is extended or adjusted under 35 U.S.C. 154(b) by 1069 days.

(21) Appl. No.: 11/558,182

(22) Filed: Nov. 9, 2006

(65) Prior Publication Data

US 2008/0114533 A1     May 15, 2008

(51) Int. Cl.
*G01C 21/00* (2006.01)
(52) U.S. Cl. .................................. 701/209; 340/908
(58) Field of Classification Search ............... 701/209, 701/1, 200, 201, 211; 340/908, 901, 995.1, 340/995.19; 455/426.2, 428, 412.1, 414.2, 455/414.1
See application file for complete search history.

(56) References Cited

U.S. PATENT DOCUMENTS

| | | | |
|---|---|---|---|
| 5,987,381 A | 11/1999 | Oshizawa | |
| 6,421,607 B1 | 7/2002 | Gee et al. | |
| 6,456,933 B1 | 9/2002 | Hessing | |
| 6,553,308 B1 | 4/2003 | Uhlmann et al. | |
| 2003/0236818 A1 | 12/2003 | Bruner et al. | |
| 2004/0128065 A1 | 7/2004 | Taylor et al. | |
| 2004/0150674 A1 | 8/2004 | Takahashi et al. | |
| 2004/0185842 A1 | 9/2004 | Spaur et al. | |
| 2005/0055155 A1 | 3/2005 | Mafune | |
| 2005/0125149 A1 | 6/2005 | Tada | |
| 2005/0149253 A1 | 7/2005 | Nambata | |
| 2005/0171686 A1 | 8/2005 | Davis | |
| 2005/0203683 A1* | 9/2005 | Olsen et al. | 701/35 |
| 2005/0222764 A1* | 10/2005 | Uyeki et al. | 701/210 |
| 2006/0015249 A1 | 1/2006 | Gieseke | |
| 2006/0036356 A1 | 2/2006 | Rasin et al. | |
| 2006/0069503 A1 | 3/2006 | Suomela et al. | |
| 2006/0116816 A1 | 6/2006 | Chao et al. | |
| 2006/0161343 A1 | 7/2006 | Agnew et al. | |
| 2007/0093958 A1* | 4/2007 | Jonsson et al. | 701/211 |
| 2007/0135995 A1* | 6/2007 | Kikuchi et al. | 701/209 |
| 2007/0140187 A1 | 6/2007 | Rokusek et al. | |
| 2007/0143018 A1 | 6/2007 | Murlidar et al. | |
| 2008/0046174 A1 | 2/2008 | Johnson | |

FOREIGN PATENT DOCUMENTS

WO   WO2004/099721 A1   11/2004

OTHER PUBLICATIONS

Chinese Office Action dated Mar. 24, 2010 for Chinese Patent Application No. 20070186019.X, 5 pages.

* cited by examiner

*Primary Examiner*—Dalena Tran
(74) *Attorney, Agent, or Firm*—Anthony L. Simon; Reising Ethington P.C.

(57) ABSTRACT

A navigational route providing method for use with various types of vehicle navigation systems. The route providing method generally enables a user to pre-select one or more destinations and trigger events, so that navigational routes leading to the pre-selected destinations can be subsequently generated and presented to the user when the designated trigger events occur. According to some embodiments, multiple destinations and trigger events can be provided so that multiple navigational routes are generated.

22 Claims, 2 Drawing Sheets

METHOD OF PROVIDING A NAVIGATIONAL ROUTE FOR A VEHICLE NAVIGATION SYSTEM

TECHNICAL FIELD

The present invention generally relates to vehicle navigation systems and, more particularly, to methods that enable a user to pre-select a destination and a trigger event so that a navigational route can be generated and presented at a later time.

BACKGROUND OF THE INVENTION

In recent years, vehicle navigation systems have grown in popularity and are now widely available in a variety of forms, including on-board or autonomous systems and off-board or telematics-based systems.

In general, on-board vehicle navigation systems include vehicle-installed units that utilize locally stored navigation information, such as that stored on a CD or DVD, to provide the user with navigation services such as turn-by-turn directions, etc. Off-board systems, on the other hand, generally utilize wireless voice and data technologies to communicate between a vehicle-installed telematics unit and a system back-end like a call center that stores navigation information, such as updated maps, real-time traffic reports, construction information, etc. Off-board systems are thus able to provide the user with turn-by-turn directions and other navigation services using up-to-date information. Each of these two types of vehicle navigation systems can typically provide a user with a detailed navigational route that guides them from a starting point to a selected destination, and can include additional features known to those skilled in the art.

SUMMARY OF THE INVENTION

According to one aspect of the invention, there is a method of providing a navigational route for a vehicle navigation system. This method generally comprises the steps of: (a) receiving a navigational route request that includes a destination and a trigger event; (b) monitoring for occurrence of the trigger event; (c) generating the navigational route once the trigger event occurs; and (d) preparing the navigational route for presentation to a user.

According to another aspect of the invention, there is a method of providing a plurality of navigational routes for a vehicle navigation system. This method generally comprises the steps of: (a) receiving a navigational route request that includes a plurality of destinations and a plurality of trigger events; (b) monitoring for occurrence of any of the plurality of trigger events; (c) generating a first navigational route once a first trigger event occurs; (d) preparing the first navigational route for presentation to a user; (e) generating a second navigational route once a second trigger event occurs; and (f) preparing the second navigational route for presentation to a user.

BRIEF DESCRIPTION OF THE DRAWINGS

Preferred exemplary embodiments of the present invention will hereinafter be described in conjunction with the appended drawings, wherein like designations denote like elements, and wherein.

DETAILED DESCRIPTION OF THE PREFERRED EMBODIMENTS

The route providing method disclosed herein enables a user to pre-select one or more destinations and trigger events, so that navigational routes leading to the pre-selected destinations can be subsequently generated and presented to the user when the designated trigger events occur. For example, a user planning a family vacation can go to an authorized website and enter a different, pre-selected destination for each day of the vacation. Then, each time the vehicle is started, a navigational route leading to that day's destination can be generated and presented to the user. In this example, the specific days and/or times that are pre-selected by the user function as trigger events, as will be explained in more detail.

Communications System—

Figure 1:
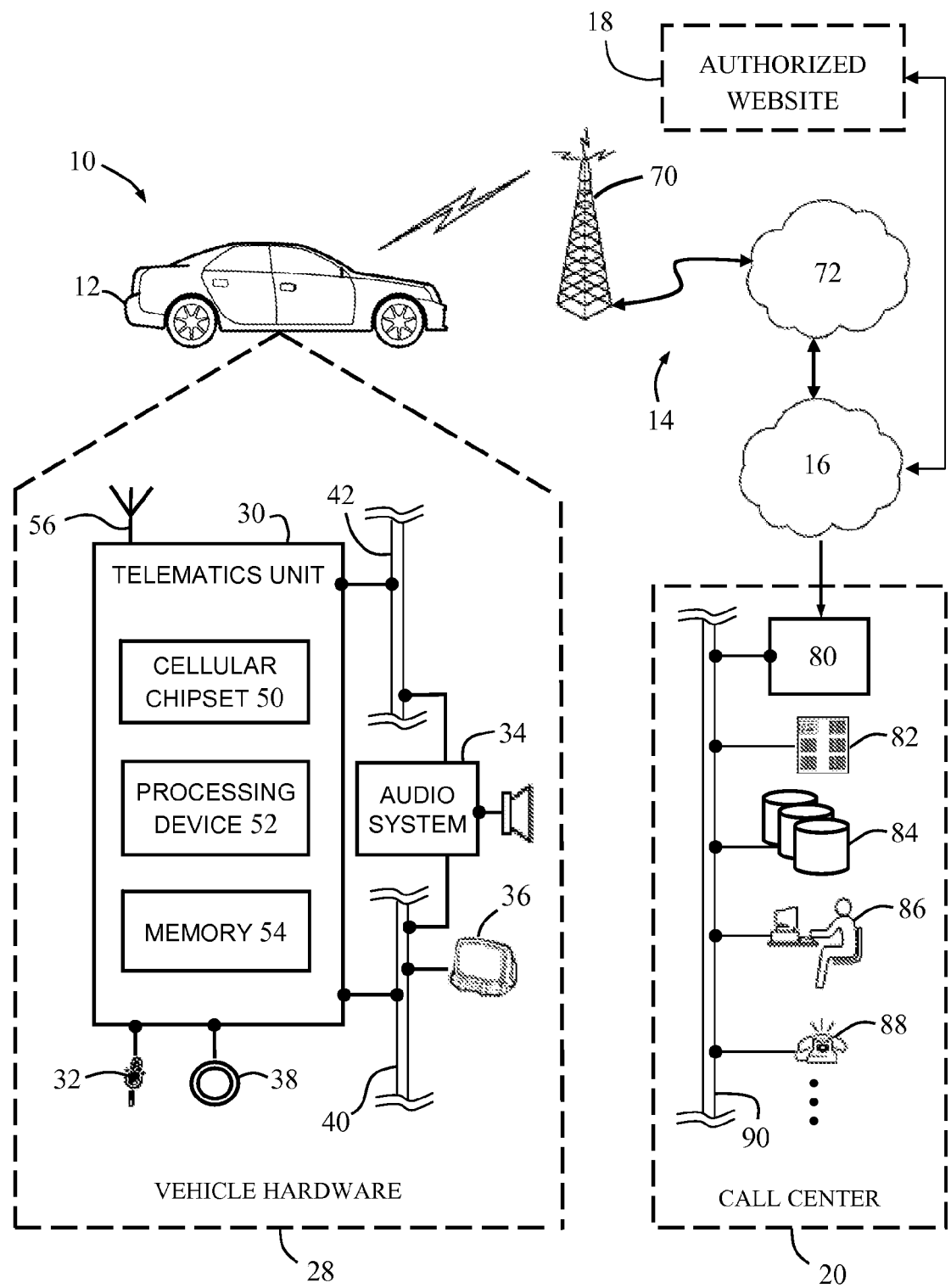
FIG. 1 is a block diagram of a system that is capable of utilizing the route providing method described below.

Beginning with FIG. 1, there is shown an exemplary operating environment that can be used to implement the route providing method disclosed herein. Communications system 10 generally includes a vehicle 12, a wireless carrier system 14, a communications network 16, an authorized website 18, and a call center 20. It should be understood that the route providing method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, and an electronic button or control 38 that are interconnected using one or more network connections, such as a communications bus 40 or an entertainment bus 42. Examples of suitable network connections include a controller area network (CAN), a media oriented system transfer (MOST), a local interconnection network (LIN), an ethernet, a local area network (LAN), and other appropriate connections such as those that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. According to one embodiment, telematics unit 30 includes a standard cellular chipset 50 for voice communications like hands-free calling, a wireless modem (not shown) for data transmission, an electronic processing device 52, one or more electronic memory devices 54, and a dual antenna 56. It should be appreciated that the modem can either be implemented through software that is stored in the telematics unit and is processed by electronic processing device 52, or it can be a separate hardware component located internal or external to telematics unit 30. The modem can operate using any number of different standards or protocols such as EVDO, CDMA, GPRS, EDGE, and WiMAX to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that enables the route providing method discussed herein.

Telematics unit 30 provides too many services to list them all, but several examples include: turn-by-turn directions and other navigation-related services that are provided in conjunction with a GPS-based vehicle navigation module (not shown); airbag deployment notification and other emergency or roadside assistance-related services that are provided in connection with one or more collision sensor interface modules such as a body control module (not shown); and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an illustration of some of the services that the telematics unit is capable of offering. Furthermore, it should be understood that the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are located external to telematics unit 30, they could utilize vehicle bus 40 and/or entertainment bus 42 for communication therebetween. It is anticipated that one or more of the modules that interact with telematics unit 30 will utilize sensors, like gyroscopes, accelerometers, magnetometers, and emission detection sensors, for reporting different operational, environmental, or other conditions surrounding the vehicle.

Vehicle hardware 28 also includes a number of vehicle user interfaces that provide vehicle occupants with a means of providing and/or receiving information, including microphone 32, audio system 34, visual display 36, and button 38. As used herein, the term 'vehicle user interface' broadly includes any suitable form of electronic device, including both hardware and software components, which is located on the vehicle and enables a vehicle user to communicate with or through a component of the vehicle. Microphone 32 provides an occupant with a means for inputting verbal or other auditory information, and can be connected to an automated voice processing unit utilizing human-machine interface (HMI) technology known in the art. Conversely, audio system 34 provides verbal output to a vehicle occupant and can be a dedicated, stand-alone system or part of the primary vehicle audio system. According to the particular embodiment shown here, audio system 34 is operatively coupled to both vehicle bus 40 and entertainment bus 42 and can provide AM, FM and satellite radio, CD, DVD and other multimedia functionality. This functionality can be provided in conjunction with or independent of the infotainment module described above. Visual display 36 is preferably a graphics display, such as a touch screen on the instrument panel or a heads-up display reflected off of the windshield, and can be used to provide a multitude of input and output functions. Button 38 is an electronic pushbutton or other control that is typically used to initiate communication or some other service with call center 20. Of course, numerous other vehicle user interfaces can also be utilized, as the aforementioned interfaces are only examples of some of the possibilities.

Wireless carrier system 14 is preferably a cellular telephone system, but could be any other suitable wireless system, such as a satellite-based system capable of transmitting signals between vehicle hardware 28 and call center 20. According to an exemplary embodiment, wireless carrier system 14 includes one or more cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 may be a conventional land-based telecommunications network that is connected to one or more landline telephones and connects wireless carrier system 14 to call center 20. For example, land network 16 may include a public switched telephone network (PSTN) and/or a TCP/IP network, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Authorized website 18 is preferably connected to call center 20 through the Internet or a private network, and provides users with input and output means, as well as a variety of services and resources. For example, a user may be able to interact with website 18 to gain access to their account settings, preferences, defaults, etc. so that they can view or edit these pieces of information. Separately, website 18 could have the ability to receive input from the user and then pass it along to call center 20 or vehicle 12 in the furtherance of certain navigation-related services. In the example where an off-board vehicle navigation system is providing turn-by-turn directions, website 18 could be used to enter the desired destination, route restrictions, or enhancements (such as avoiding certain highways, or taking certain short cuts, etc.) The authorized website can then make this information available to route generating resources at call center 20 so that a corresponding navigational route is generated. Although described as a conventional website, one skilled in the art will recognize that other systems, entities and methods of inputting and outputting information could also be used. For example, a system user could request navigational routes and other navigation-related services through a cell phone, a personal digital assistant, a computing kiosk, a personal or laptop computer, or some other entity having access to call center 20 and/or vehicle 12.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder and can be connected to various devices such as a server 82 and database 84. Database 84 could be designed to store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Methods for Providing a Navigational Route—

Figure 2:
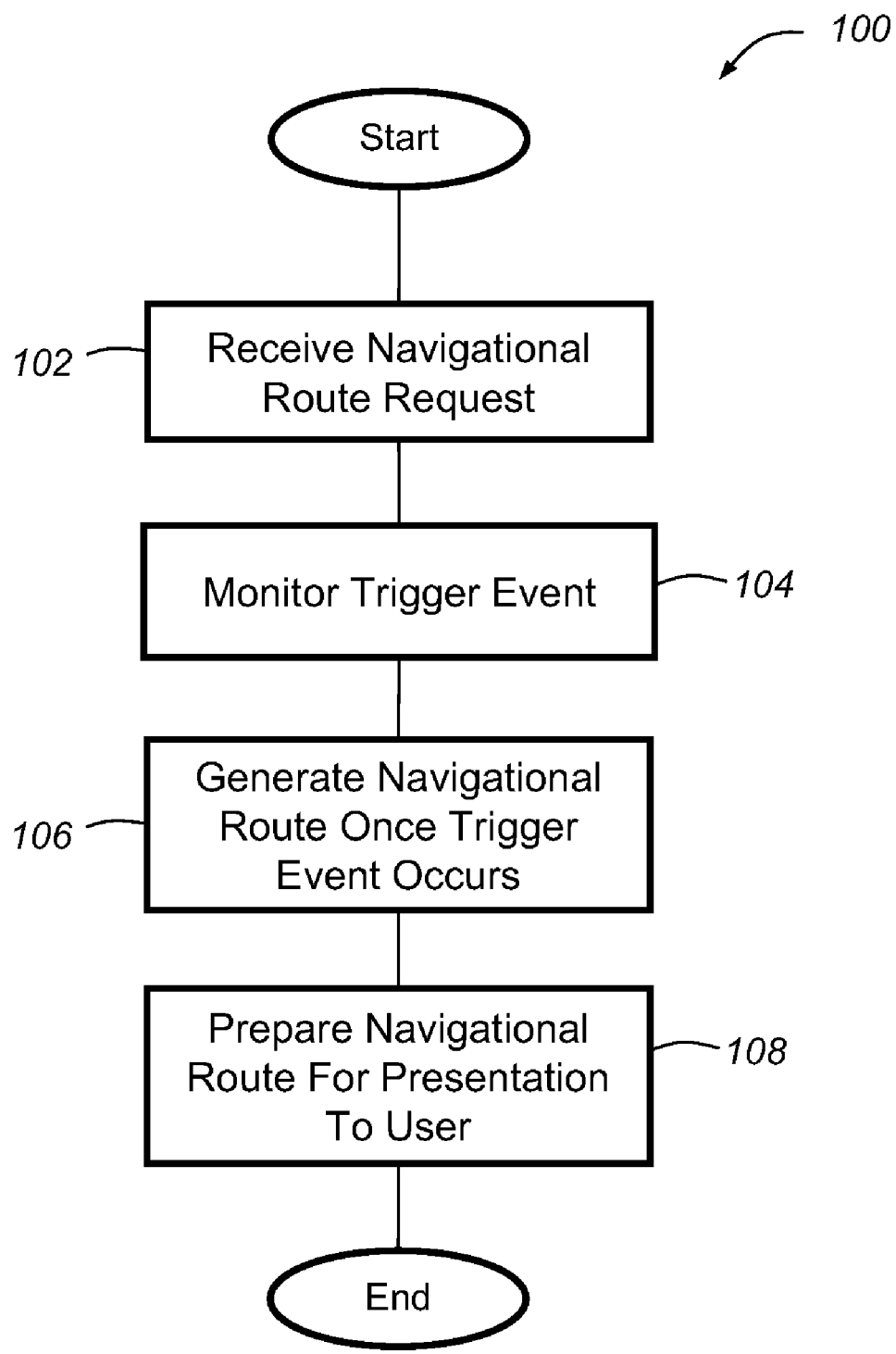
FIG. 2 is a flowchart showing some of the steps of an embodiment of the route providing method.

Turning now to FIG. 2, there is shown a flowchart demonstrating some of the steps of an embodiment of route providing method 100 which enables a user to pre-select one or more destinations and trigger events, so that navigational routes leading to the pre-selected destinations can be subsequently provided to the user when the designated trigger events occur.

Beginning with step 102, the method receives a navigational route request from a user that includes at least one destination and at least one trigger event. It should be understood that the navigational route request can be received at one of a number of different locations within system 10 and according to one of a number of different techniques. For instance, a user can contact call center 20 and verbally provide a navigational route request to either a live advisor 86 or some type of automated response system so that the navigational route request becomes entered into the system. A user can access an authorized website 18 and enter a navigational route request so that the request is subsequently forwarded to call center 20 and/or vehicle 12, depending upon the particular implementation of the method. A user can provide a navigational route request directly to the vehicle through in-vehicle interaction with a vehicle user interface 32-38. Also, it is possible for a user to utilize a portable communications device, such as a cellular phone, a personal digital assistant (PDA), a handheld computer, or another electronic device capable of electronic communication to provide the navigational route request in step 102 through electronic interaction with call center 20 and/or vehicle 12. Optional features associated with step 102 could include allowing the user to chose from a list of previously selected destinations, to browse from a menu of popular destinations, and to access other user electronic resources like personal calendars (Microsoft Outlook®, etc.) in order to provide the user with various destination and/or trigger event options.

Furthermore, it should be appreciated that a variety of types of destinations and trigger events can be selected by the user and included within the navigational route request. As an example, a user can identify a destination by providing an actual street address, an intersection, cross-roads, a city and state, or maybe even a well known point-of-interest, as is understood by those skilled in the art. Similarly, the user is preferably given flexibility in the type of trigger events that they can select. They can, for example, select a designated point in time (date, day, time, combination thereof, etc.) to be the trigger event, so that a navigational route is generated at some moment after the passing of the designated point in time. It is of course possible for the navigational route to be instantaneously generated following the elapse or passing of the designated point in time, or the navigational route can be generated at some delayed time thereafter. Alternatively, a user can select a particular location to be the trigger event, so that once the vehicle encounters the pre-selected location, the navigational route will be generated and provided to the user. Examples further illustrating these types of trigger events will be subsequently provided and explained. It is possible for the pre-selected trigger event to include a combination of trigger events or conditions; two or more events must occur (an 'AND' situation) before a navigational route is generated, any one of multiple events must occur (an 'OR' situation) before a navigational route is generated, etc.

In step 104, the present method monitors one or more pre-selected trigger events to determine if and when they occur. The precise way in which the trigger events are monitored and the resources responsible for performing the monitoring depend on a number of factors, including the nature of the selected trigger event and whether the vehicle navigation system is an on-board system or an off-board system, to name but two factors. In the case of a temporal trigger event such as a day and/or time, the method can monitor the passing of the trigger event at call center 20, at vehicle 12, or at some other location. If that temporal trigger event is monitored at the call center, then it is preferable that the vehicle navigation system be an off-board system having a telematics unit 30 located in the vehicle and route generating capabilities located at call center 20. In the case of a spatial trigger event such as a particular location, then it is preferable that the trigger event be monitored at the vehicle. This is at least partially because the GPS receiver that is typically used to determine the vehicle's position is located in the vehicle hardware 28, thus making it most practical to monitor the spatial trigger event at the vehicle. It should be appreciated, however, that step 104 could be performed at call center 20, vehicle 12, some other location, or any combination thereof, that is, the method could use several different resources to monitor the trigger event in step 104.

Once the trigger event has occurred, a navigational route extending between a starting point and a destination is generated, step 106. In order to generate a navigational route, it is usually necessary to have at least a starting point and a destination. The starting point can be the current location of the vehicle, as determined by a GPS receiver located in the vehicle navigation module or another position determining unit located on the vehicle, or it can be a pre-selected starting point provided by the user. If the current vehicle location is used, then the GPS receiver, etc. must send the current vehicle location to the navigational route generator. In off-board vehicle navigation systems, this usually entails wirelessly sending a vehicle position from telematics unit 30 to call center 20, so that the call center can devise a navigational route before sending it back to the vehicle. Alternatively, if the starting point is a pre-selected location, then it can be included with the destination and trigger event information provided in the navigational route request received in step 102. The navigational route can be generated according to one of a number of different known route-generating techniques, algorithms, methods, etc., and can include numerous additional features known in the navigation routing art.

Once the navigational route is generated, it is prepared for presentation to the user, which preferably occurs by means of one or more vehicle user interfaces 32-38, step 108. In off-board systems, the navigational route generated at call center 20 is preferably wirelessly sent to telematics unit 30 before being presented to the user. On-board vehicle navigation systems, on the other hand, will usually transmit the route from the vehicle navigation module to one or more vehicle user interfaces 32-38 via a network connection, such as communication bus 40. Again, it should be appreciated that there a number of different ways to present a navigational route to a user including, but certainly not limited to, verbally or graphically providing turn-by-turn directions, simply providing the vehicle user with a map of the route and an indication as to where the vehicle currently is, etc. It is also possible to ask the user if they would like to be presented with the navigational route before actually presenting the route to them. In this embodiment, the navigational route is prepared for presentation, but is not actually presented if the user answers 'no' or engages a 'snooze' type feature that enables them to delay the presentation. For instance, when the user is informed that there is a navigational route available for a particular destination, they could engage the snooze feature and simply delay its delivery by a certain amount of time or they could alter the trigger event such that its delivery is conditional upon a new trigger event. The user could also opt to simply cancel the navigational route altogether.

Several examples will now be provided to describe different manners in which route providing method 100 may be performed. According to a first example that was previously mentioned, a user planning a family vacation can go to an authorized website and enter a different, pre-selected destination for each day of the vacation. Through the authorized website 18, the user indicates that they would like to visit the following destinations according to the following trigger events: 1) Epcot® at Walt Disney World® in Orlando, Fla.—Thursday, September $14^{th}$, 9:00 am, 2) Kennedy Space Center, Cape Canaveral, Fla.—Friday, September $15^{th}$, anytime, and 3) Orlando International Airport—Sunday, September $17^{th}$, 12:00 pm. The authorized website 18 then sends a navigational route request to call center 20, which is part of an off-board vehicle navigation system. The call center continues to monitor the various trigger events until one of them occurs.

The first trigger event to occur in this example is an elapse of a designated time (Thursday, September $14^{th}$, 9:00 am). The first time that the vehicle is in operation on or after Thursday, September $14^{th}$, 9:00 am, call center 20 determines that the temporal trigger event has occurred and wirelessly sends telematics unit 30 a request for the current vehicle location; the current vehicle location is used as the starting point in this example. The telematics unit then queries a GPS receiver for the current vehicle location, and then wirelessly sends that location back to call center 20. Having both the current vehicle location and the pre-selected destination, the call center is able to generate a navigational route for the user that leads them from their present position to Epcot® at Walt Disney World® in Orlando, Fla. The navigational route is then wirelessly sent back to telematics unit 30 so that it can be presented to the user via one or more vehicle user interfaces 32-38.

The next trigger event to occur is an elapse or passing of another designated time, namely, Friday, September $15^{th}$, anytime. Because the user is not required to be at the corresponding destination at any particular time, they have entered 'anytime'. Thus, the first time that the vehicle is started or is in operation on Friday, Sep. 15, 2006 (no matter the time of day), the call center detects that a second trigger event has occurred and goes through a process similar to that described above so that a navigational route extending from the vehicle's current location to Kennedy Space Center in Cape Canaveral, Fla. is generated. After this second navigational route is generated and presented to the user, the method simply waits and monitors the remaining temporal trigger event (Sunday, September $17^{th}$, 12:00 pm) to determine if it occurs and performs the same process when it does. It should be recognized that this illustration is simply intended to highlight some of the features of route-generating method 100 and is not intended to disclose all of the possible variations. For instance, it is certainly possible for the monitoring of the trigger events to occur at the vehicle (as opposed to the call center), for the vehicle navigation system to be an on-board system (instead of an off-board system), for the navigational routes to be saved for access at a later time, and for trigger events other than temporal trigger events to be used, to name but a few.

According to a second example, a user can engage the route generating method described above to plan out a series of errands or short trips around town, for example. Utilizing microphone 32 and hands-free voice recognition features, the user identifies a series of destinations that they would like to travel to and indicates that once they have reached one destination in the series, they would like to be presented with a navigational route leading to the next destination; that is, the various destinations serve as spatial trigger events. In this example, the vehicle navigation system is an on-board system and the destinations include: 1) the office of Dr. Smith, D.D.S. located at 123 Main Street, Royal Oak, Mich., 2) Jack's Oil Change Shop at the cross-roads of Main and $3^{rd}$, Royal Oak, Mich., and 3) the Secretary of State located in the city of Southfield, Mich.

First, the route providing method uses the current location of the vehicle and the first destination (the office of Dr. Smith, D.D.S.) to generate and present a navigational route to the user. The user then follows the provided route until they arrive at Dr. Smith's office, at which time they presumably turn off the car and perform their errand. The next time the vehicle is started, the method generates a second navigational route extending from the dentist's office to Jack's Oil Change Shop. It can be seen that the vehicle's encounter with the first destination is actually the trigger event that causes the method to generate a navigational route to the second or next destination. This process continues until all of the destinations have been reached. Again, it should be noted that a number of additional features, steps, processes, etc. could be used in lieu of or in addition to the exemplary method described above.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like", and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of providing a navigational route for a vehicle navigation system, comprising the steps of:
   (a) receiving a navigational route request that includes a destination and a trigger event;
   (b) monitoring for occurrence of the trigger event;
   (c) generating the navigational route once the trigger event occurs, wherein the navigational route generally extends between a starting point and the destination;
   (d) asking a user if they want to be presented with the navigational route; and, if so,
   (e) presenting the navigational route to the user.

2. The method of claim 1, wherein the vehicle navigation system is an off-board system that includes a telematics unit located in the vehicle and a call center with route generating capabilities.

3. The method of claim 2, wherein step (c) further includes wirelessly sending a current vehicle location from the telematics unit to the call center before generating the navigational route, and wherein the method further includes wirelessly sending the navigational route from the call center to the telematics unit before presenting it to the user.

4. The method of claim 1, wherein the vehicle navigation system is an on-board system that includes route generating capabilities located in the vehicle.

5. The method of claim 1, wherein the navigational route request in step (a) is received from a user through verbal interaction with the call center.

6. The method of claim 1, wherein the navigational route request in step (a) is received from a user through web-based interaction with an authorized website.

7. The method of claim 1, wherein the navigational route request in step (a) is received from a user through in-vehicle interaction with a vehicle user interface.

8. The method of claim 1, wherein the navigational route request in step (a) is received from a user through electronic interaction with a portable communications device.

9. The method of claim 1, wherein the trigger event includes a designated location, so that the navigational route in step (c) is generated at some moment after an encounter between the vehicle and the designated location.

10. The method of claim 1, wherein the starting point used in step (c) is the current location of the vehicle.

11. The method of claim 1, wherein step (a) further includes receiving a plurality of destinations and a plurality of trigger events so that each time a trigger event occurs, a corresponding navigational route is prepared for presentation to the user.

12. The method of claim 11, wherein the plurality of trigger events includes a plurality of destinations so that a new navigational route is generated each time the vehicle encounters a new destination.

13. The method of claim 1, wherein step (d) further includes providing a snooze feature in the event that the user does not want to be presented with the navigational route at that time.

14. A method of providing a navigational route for a vehicle navigation system, comprising the steps of:
   (a) receiving a navigational route request that includes a destination and a trigger event;
   (b) monitoring for occurrence of the trigger event;
   (c) generating the navigational route once the trigger event occurs, wherein the navigational route generally extends between a starting point and the destination; and
   (d) preparing the navigational route for presentation to a user,
   wherein the trigger event includes a designated point in time, so that the navigational route in step (c) is generated at some moment after the designated point in time.

15. A method of providing a plurality of navigational routes for a vehicle navigation system, comprising the steps of:
   (a) receiving a navigational route request that includes a plurality of destinations and a plurality of trigger events;
   (b) monitoring for occurrence of any of the plurality of trigger events;
   (c) generating a first navigational route once a first trigger event occurs, wherein the first navigational route generally extends between a starting point and the first destination;
   (d) preparing the first navigational route for presentation to a user;
   (e) generating a second navigational route once a second trigger event occurs, wherein the second navigational route generally extends between a starting point and the second destination; and
   (f) preparing the second navigational route for presentation to a user.

16. The method of claim 15, wherein at least one of the trigger events includes a designated point in time, so that a navigational route is generated at some time after the designated point in time.

17. The method of claim 15, wherein at least one of the trigger events includes a designated location, so that a navigational route is generated at some time after an encounter between the vehicle and the designated location.

18. The method of claim 15, wherein at least one of the starting points used in the generation of the navigational routes is the current location of the vehicle.

19. The method of claim 15, wherein prior to at least one of steps (d) and (f), the method further includes the step of asking the user if they want to be presented with the navigational route before presenting the navigational route to the user.

20. The method of claim 19, wherein at least one of steps (d) and (f) further includes providing a snooze feature in the event that the user does not want to be presented with a navigational route at that time.

21. A method of providing a navigational route for a navigation system, comprising the steps of:
   (a) receiving a navigational route request that includes a destination and a trigger event;
   (b) monitoring for occurrence of the trigger event;
   (c) determining after occurrence of the trigger event whether a user wants to be presented with the navigational route;
   (d) presenting the navigational route to the user if the user wants to be presented with the navigational route; and
   (e) delaying or canceling presentation of the navigational route if the user does not want to be presented with the navigational route.

22. The method of claim 21, wherein step (e) further includes providing a snooze feature in the event that the user does not want to be presented with the navigational route at that time.

* * * * *